W. P. MEEKER.
TILE AND TILE FACED SURFACE.
APPLICATION FILED OCT. 18, 1906.
943,950.
Patented Dec. 21, 1909.
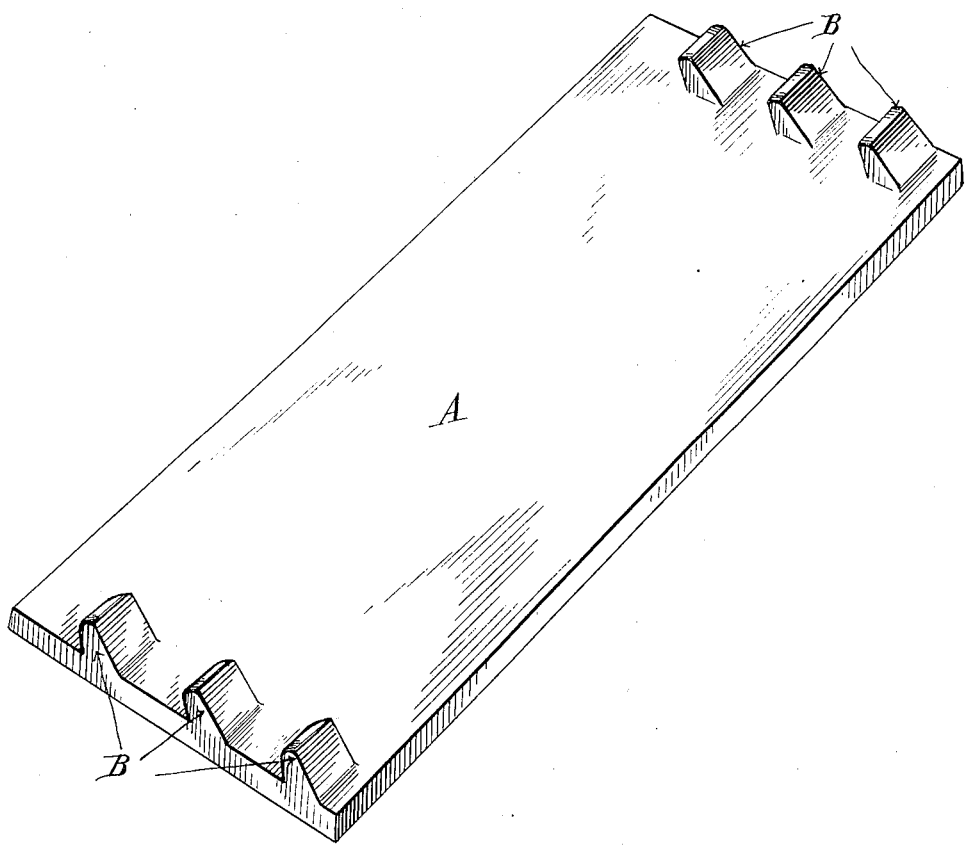

UNITED STATES PATENT OFFICE.

WILLIAM PASSMORE MEEKER, OF NEWARK, NEW JERSEY.

TILE AND TILE-FACED SURFACE.

943,950. Specification of Letters Patent. Patented Dec. 21, 1909.

Application filed October 18, 1906. Serial No. 339,457.

*To all whom it may concern:*

Be it known that I, WILLIAM PASSMORE MEEKER, of Newark, Essex county, New Jersey, have invented certain new and useful Improvements in Tiles and Tile-Faced Surfaces, of which the following is a specification.

My invention relates to glass tiles which are used for forming an outer finish on walls, ceilings and similar surfaces, and consists in the particulars hereinafter set forth.

In the drawing I have shown a perspective view of the back and edge of one of my improved tiles, which consists essentially of a body A provided with a plain-surfaced back with short, inclined holding-flanges B B at each end. These flanges which are tapered laterally from the bottom to the top, are all inclined toward one edge of the tile, and are preferably a trifle longer than they are wide, substantially as shown in the drawing. That portion of the back of the tile lying between these flanges is uniformly plain or even, or approximately so.

As is well understood in the art, the principal difficulty in satisfactorily securing in position glass tiles provided with holding portions upon their backs arises from the stress which is put upon the holding portions and the tile by the setting of the cement upon which it may be mounted. If the cement lies between extended and opposite holding flanges or surfaces, the setting of the cement is liable to either break the tile or to fracture or strip the holding-flanges or projections off of the tile body; and if a multiplicity of extended projections are formed upon the back of the tile, this tendency to fracture and strip is rather increased than diminished; but by forming short, stout, but relatively thin and inclined flanges at either end of the tile, I leave the entire central back portion free so that the cement may give or set beneath it without dragging unduly upon it; while the upwardly tapered form of the openings between the flanges B B and their comparatively short length permits the cement filling to set without producing undue lateral pressure upon those flanges; and the relative thinness of the flanges causes their ends to present such small resistance surfaces that the flanges will successfully sustain any longitudinal stress to which they are subjected by the setting of the cement, the form and relative disposition of the flanges permitting them to move laterally in the cement without disturbing the clasp of the cement socket upon their flat, parallel ends.

Having thus described my invention what I claim and desire to secure by Letters Patent of the United States is:—

A glass facing-tile embodying a plain-surfaced back provided at each end with a plurality of short, stout but relatively thin holding-flanges each having two converging sides and two parallel sides and all of said flanges being laterally inclined in the same direction.

WILLIAM PASSMORE MEEKER.

Witnesses:
WM. D. NEILLEY,
WILLIAM H. MOHR.